United States Patent [19]
Takahashi

[11] Patent Number: 5,892,181
[45] Date of Patent: Apr. 6, 1999

[54] STRUCTURE FOR MOUNTING SENSING DEVICES FOR MEASURING A VEHICLE LOAD

[75] Inventor: Naoya Takahashi, Shizuoka, Japan

[73] Assignee: Yazaki Corporation, Tokyo, Japan

[21] Appl. No.: 836,952

[22] PCT Filed: May 23, 1996

[86] PCT No.: PCT/JP96/01374

§ 371 Date: Sep. 18, 1997

§ 102(e) Date: Sep. 18, 1997

[87] PCT Pub. No.: WO96/37760

PCT Pub. Date: Nov. 28, 1996

[30] Foreign Application Priority Data

May 24, 1995 [JP] Japan ................................. 7-124860

[51] Int. Cl.$^6$ .................................................. G01G 19/02
[52] U.S. Cl. ................. 177/136; 177/210 R; 177/DIG. 9
[58] Field of Search ................................. 177/136, 137, 177/138, 210 R, DIG. 9

[56] References Cited

FOREIGN PATENT DOCUMENTS

| | | | |
|---|---|---|---|
| 50-3369 | 1/1975 | Japan . | |
| 50-97377 | 8/1975 | Japan | G01L 1/22 |
| 1-172711 | 7/1989 | Japan | G01G 13/12 |
| 6-69758 | 9/1994 | Japan | G01G 19/12 |
| 6-313740 | 11/1994 | Japan | G01L 1/22 |

*Primary Examiner*—Randy W. Gibson
*Attorney, Agent, or Firm*—Sughrue, Mion, Zinn, Macpeak & Seas, PLLC

[57] ABSTRACT

A structure for mounting sensing devices for measuring a vehicle load which allows the sensing device to obtain a detection value according to the actual load without being affected by the loading condition of baggage on the rear body, the inclination condition of the road, the steering condition of a handwheel, and the like. In a structure for mounting sensing devices 7 for measuring a load on an axle member 5 in which a load G of the vehicle is dispersedly imposed on both ends, recessed housing portions 5f and 5g are formed along the axial direction of the axle member 5 in both end portions 5a and 5b of the axle member 5, respectively. The sensing devices 7 are housed, mounted, and fixed in the recessed housing portions 5f and 5g, while the directions of the sensing devices 7 in a circumferential direction and a radial direction of the axle member 5 are made coincident with each other.

2 Claims, 10 Drawing Sheets

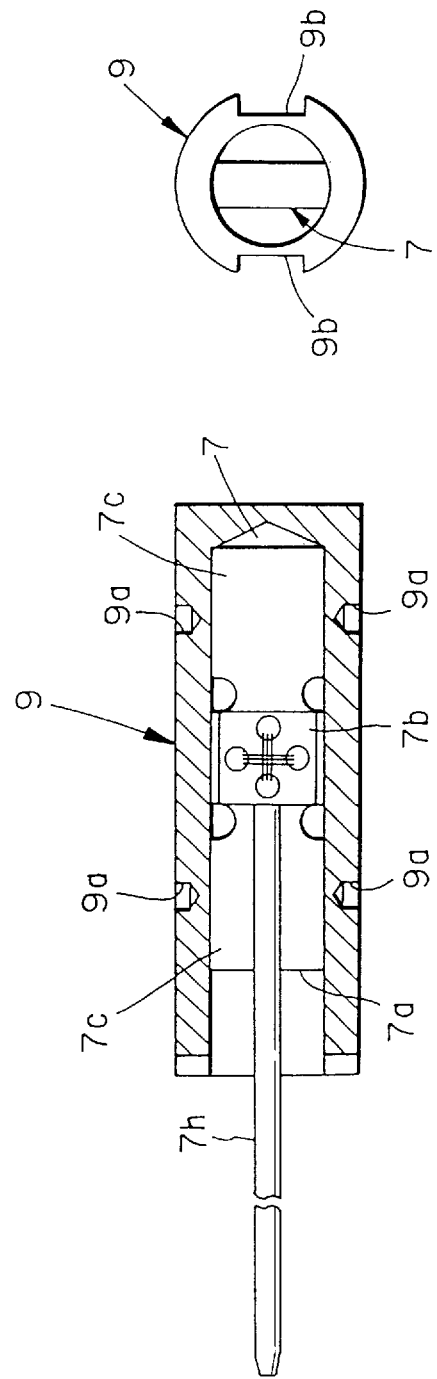

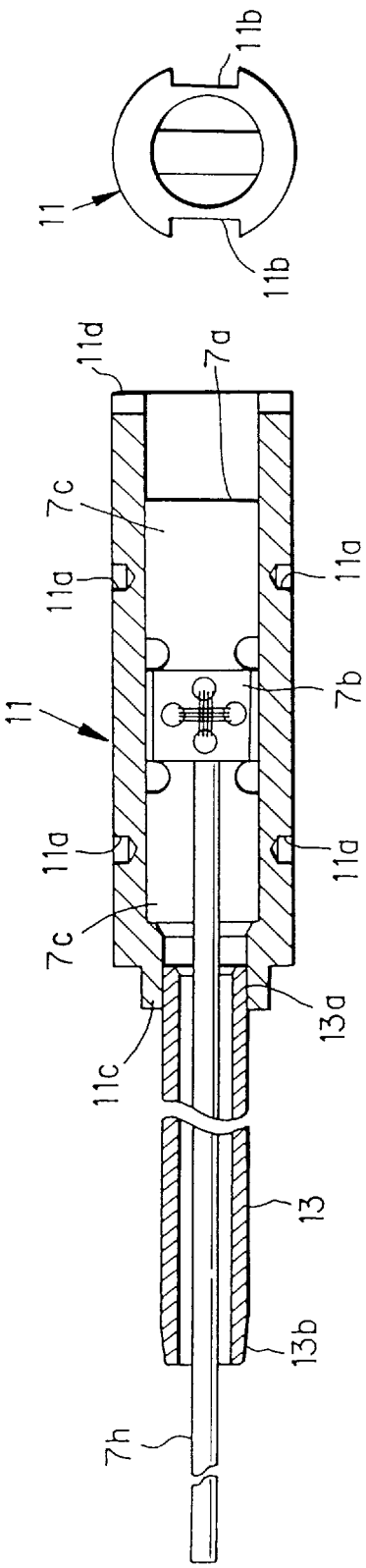

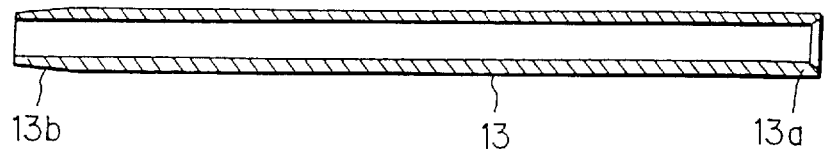
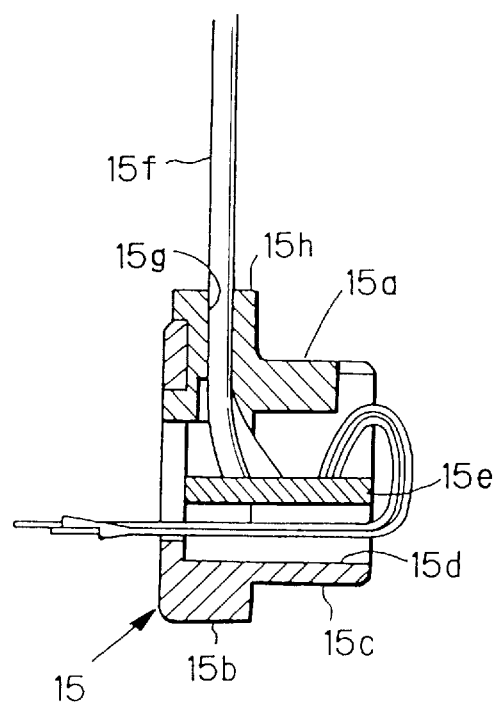 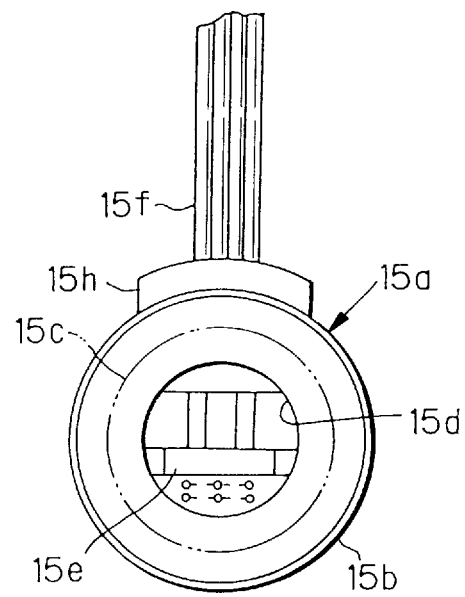

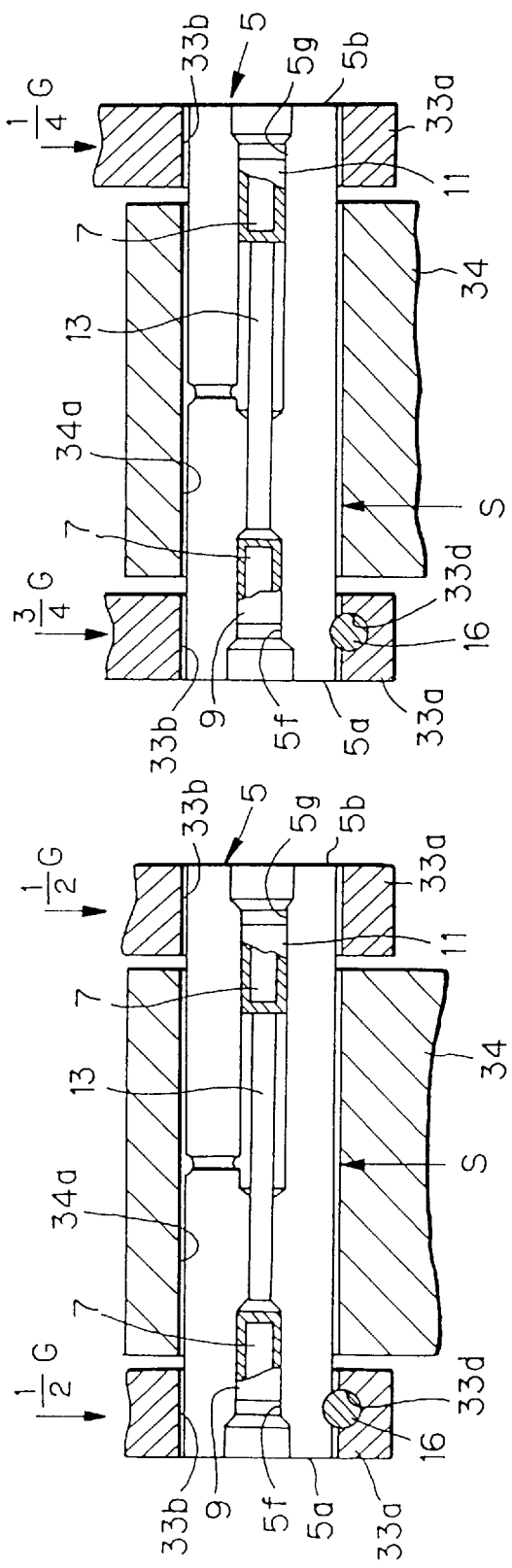

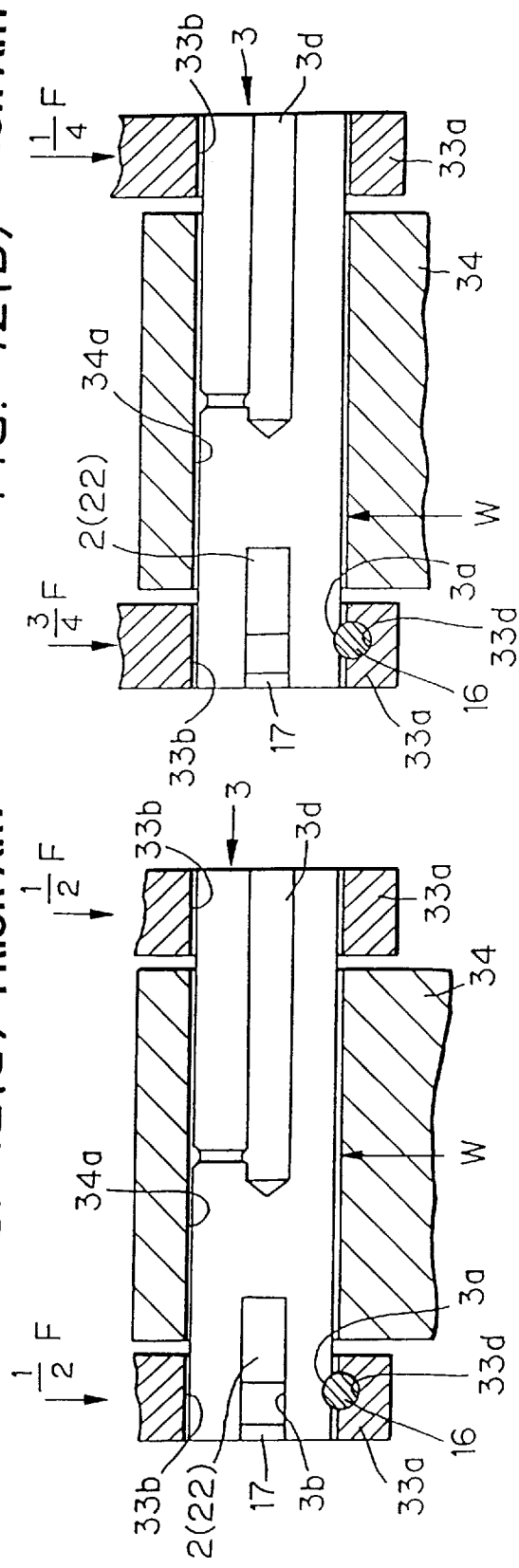

STRUCTURE FOR MOUNTING SENSING DEVICES FOR MEASURING A VEHICLE LOAD

TECHNICAL FIELD

The invention relates to a structure for mounting sensing devices for measuring a load which are to be disposed in a vehicle such as a truck.

BACKGROUND ART

The measurement of a load of a vehicle is performed mainly on a large vehicle such as a truck and, for example, for the purposes of preventing traffic accidents such as turnover due to overload, and of preventing deterioration of vehicles and road surfaces from being stimulated.

Conventionally, a load of a vehicle is measured by placing a vehicle to be measured on a platform weighing machine which is so called "KANKAN" in Japanese. The facilities are large scaled, and necessitate a wide installation space, so that the number of platform weighing machines which can be installed is limited. Therefore, a number of vehicles cannot be measured at a time. Additionally, the installation cost is increased.

In recent years, a load measuring apparatus which is mounted on a vehicle itself to measure a load is provided.

In a conventional load measuring apparatus which is mounted on a vehicle, generally, sensing devices for measuring a load, for example, strain gauge sensors are attached to arcuate leaf springs which are interposed between a rear body frame and axle shafts, and the load is calculated based on the total of measured values of the sensing devices.

Hereinafter, the structure of a conventional load measuring apparatus which was proposed by the applicant will be described with reference to FIGS. 8 and 9.

FIG. 8 is an exploded perspective view of a large vehicle such as a truck and showing a vehicle portion in which the load measuring is performed by the load measuring apparatus. In the figure, 31 designates a leaf spring which functions as a suspension, and 32 designates a rear body frame.

Two yoke brackets 33 are fixed to the rear body frame 32 with being separated from each other in the longitudinal direction by a distance corresponding to the size of the leaf spring 31. One end of the leaf spring 31 is swingably coupled to one of the brackets 33 via a cylindrical pin 33A.

A yoke shackle 34 is swingably coupled to the other bracket 33 via a cylindrical shackle pin 3. The other end of the leaf spring 31 is swingably coupled to the shackle pin 34 via a cylindrical pin 34A. As a result, the leaf spring 31 is attached to the rear body frame 32. An axle shaft (not shown) is attached to the rear body frame 32 via the leaf spring 31.

FIG. 9(a) is a section view of the shackle pin 3 and showing a location of a sensing device in the load measuring apparatus proposed by the applicant, and FIG. 9(b) is a view looking in the direction of the arrow A of FIG. 9(a).

As shown in FIG. 9(a), an insertion hole 33b for the shackle pin 3 is formed on each of side faces 33a of the yoke bracket 33. On one side face 33a, as shown in FIG. 9(b), a slit 33c which elongates from an end of the side face to the insertion hole 33b is formed.

In addition, as shown in FIG. 9(a), a through hole 33d which elongates in a direction perpendicular to the insertion hole 33b and passes through the portions of the side face 33a on both sides of the slit 33c is formed in the one side face 33a.

The through hole 33d is configured in such a manner that, in a condition where a fixing bolt 16 for the shackle pin 3 is inserted as shown in FIG. 9(b), the fixing bolt 16 can be engaged with an annular groove 3a formed on the surface in the vicinity of an end portion of the shackle pin 3 as shown in FIG. 9(a).

An insertion hole 34a having an inner diameter corresponding to the insertion hole 33b is formed in a basal portion of the shackle 34.

The shackle 34 is attached to the bracket 33 in the following manner.

First, the shackle pin 3 is inserted into the insertion holes 33b, 34a, and 33b of the side faces 33a of the bracket 33 and the shackle 34 which are mutually positioned. The fixing bolt 16 is inserted into the through hole 33d, so as to be engaged with the groove 3a of the shackle pin 3.

Next, the gap of the slit 33c is reduced by screw motion of a nut 16A which is screwed onto an end of the fixing bolt 16 as shown in FIG. 9(b).

This causes the inner diameter of the insertion hole 33b of the one side face 33a to be reduced, thereby clamping and fixing the shackle pin 3.

In this way, the attachment is completed.

Then, as shown in FIG. 9(a), the sensing device 2 for measuring a load is fitted into a hollow hole 3b which is bored in a center portion of one end of the shackle pin 3 in the axial direction, and a screw groove 3c is provided in the vicinity of an entrance of the hole 3b.

The sensing device 2 is made of a magnetic material such as Permalloy and comprises a center plate-like member 2e and cylindrical fixing members (holders) 2d which are on both sides of the center plate-like member. A resistance wire 2a serving as a sensing portion is attached by an adhesive to a portion of the plate-like member 2e. A lead wire 2c from the resistance wire 2a is led through the hole 3b of the shackle pin 3 to the outside from the hole 3b.

A mudguard tap 17 is screwed to the entrance of the hole 3b by means of the screw groove 3c. The lead wire 2c is led through a hole formed in a center portion of the tap 17 to the outside of the hole 3b. A hole 3d formed on the side opposite to the hole 3b of the shackle pin 3 is a hole for supplying grease.

The sensing device 2 of the above-described conventional load measuring apparatus is positioned in a location which is in the hole 3b of the shackle pin 3 and stretches over the shackle 34 and the one side face 33a of the bracket 33. When a load F is imposed on the shackle pin 3 from the vehicle via the rear body frame 32 and the brackets 33, a shearing force acts on the shackle pin 3, so that the sensing device disposed in the inside is distorted. This causes the sensing output to be varied and the load of the vehicle is detected.

The sensing device 2 must be fixed inside the hole 3b so that the direction of the plate-like member 2e coincides with the load direction to the shackle pin 3.

In the conventional art, therefore, a method in which an adhesive is applied to the surface of the sensing device 2 and the sensing device 2 is then fitted into the hole 3b of the shackle pin 3, and another method in which the sensing device 2 in the hole 3b is irradiated with a beam through a small hole elongating from the outer circumference of the shackle pin 3 to the hole 3b, and the sensing device 2 is welded to the inner wall of the hole 3b are mainly used.

However, the fixing by using an adhesive involves a problem in the strength of adhesive bonding, and the fixing by the beam welding necessitates troublesome processes such as that a small hole is bored in the shackle pin 3, and that the optical axis of the beam is precisely aligned with the small hole.

To comply with this, the applicant has proposed a sensing device and a method of fixing the sensing device which can solve the problems, in Unexamined Japanese Patent Publication No. Hei. 6-313740.

FIG. 10 is a perspective view of the proposed sensing device. The sensing device 22 comprises a center plate-like member 22e and fixing members 22da and 22db on both sides thereof, in a similar manner to the above-described conventional sensing device 2.

In the sensing device 22, the one fixing member 22da is formed so as to have a substantially truncated cone shape of a tapered form. In the other fixing member 22db, a groove 22dc for leading out a lead wire of a resistance wire which is not shown in the figure, from the center plate-like member 22e, and a key groove 22dd into which a wedge key 4 (FIG. 11) is pressingly fitted are formed.

In order to internally house and fix the thus configured sensing device 22, a hole 3b of a shackle pin 3 is structured so that the inner diameter of a portion of the hole 3b near the entrance is different from that of a portion of the hole 3b on the innermost side as shown in a section view of FIG. 11. Specifically, a portion of the hole 3b which faces the one fixing member 22da in a condition where the sensing device 22 is housed is formed as a tapered face 3ba corresponding to the outer diameter of the fixing member 22da.

The sensing device 22 is inserted from the side of the one fixing member 22da into the hole 3b. When the outer circumference of the fixing member 22da comes in contact with the tapered face 3ba and the sensing device 22 is stopped at the depth of the hole 3b, the wedge key 4 is pressingly fitted into a gap between the key groove 22dd and the inner circumference of the hole 3b, whereby the sensing device 22 is fixed in the insertion direction and a circumferential direction of the hole 3b. Finally, a tap 17 is screwed to the screw groove 3c at the entrance of the hole 3b, so as into close the hole 3b.

In the measurement of a load F of a vehicle by using the sensing devices 2 and 22 in the shackle pin 3 shown in FIGS. 9 to 11, the brackets 33 are integrally fixed to the rear body frame 32. If the remaining brackets 33 and the shackle 34 are integrated, therefore, all the components in the range from the rear body frame 32 to the shackle 34 are integrated.

Accordingly, a detection value according to the actual load can be obtained from the outputs of the sensing devices 2 and 22 irrespective of the position in the axial direction of the shackle pin 3 where the load center acting on the shackle pin 3 is located, that is, without being affected by conditions such as the loading condition of baggage on the rear body, the inclination condition of the road, and the steering condition of the handwheel.

Actually, however, the inner diameters of the insertion holes 33b, 34a, and 33b of the side faces 33a of the bracket 33 and the shackle 34 are larger than the outer diameter of the shackle pin 3 in order to facilitate the insertion of the shackle pin 3 into the insertion holes 33b, 34a, and 33b. As shown also in FIG. 9(a), a slight clearance is formed between them, so that the bracket 33 and the shackle 34 are not integrated via the shackle pin 3.

Accordingly, for example, in a condition where the load is equally dispersed in the right and left directions of the vehicle, as schematically shown in FIG. 12(a), the load center W acting on the shackle pin 3 is located in a substantial center position in the axial direction of the shackle pin 3, and halves of the load F are equally imposed from both the side faces 33a of the bracket 33 on both the ends of the shackle pin 3 in the axial direction, respectively. Thus, the load can be correctly obtained by doubling the output of the sensing device 2, or by other methods. In such a condition, therefore, there arises no problem.

As schematically shown in FIG. 12(b), if the load dispersion of the vehicle is displaced in either of the right and left directions, however, the load center W is displaced toward one end side of the axial direction of the shackle pin 3. For example, ¾ of the load F is imposed from one side face 33a of the bracket 33 on one end side of the axial direction of the shackle pin 3, and ¼ of the load F is imposed from the other side face 33a of the bracket 33 on the other end side of the shackle pin 3. Thus, the imposition of the load on the ends of the shackle pin 3 is unbalanced. This causes a disadvantage in that the load cannot be correctly calculated from the output of the sensing device 2.

Additionally, it is necessary to form the one fixing member 22da of the sensing device 22 and the tapered face 3ba of the shackle pin 3 shown in FIGS. 10 and 11 so as to have a tapered shape. Furthermore, there is a disadvantage in that, in order to surely fix the sensing device 22, both of the one fixing member 22da and the tapered face 3ba should be machined with high precision.

According to the above-described fixing method, the sensing device 22 is pressingly fitted into the hole 3b and pressed against the innermost side by applying a force to some extent so that the outer circumference of the one fixing member 22da is closely in contact with the tapered face 3ba. During this process and a process of pressingly fitting the wedge key 4 into the gap between the key groove 22dd and the inner circumference of the hole 3b, it is necessary to control the application of the force so as to realize an appropriate condition. This produces a disadvantage in that the assembling process is complicated, and hence the production cost is increased.

The invention has been conducted in view of the above-described circumstances. It is a first object of the invention to provide, in a load measuring apparatus which measures a vehicle load by using sensing devices for an axle member in which the vehicle load is dispersedly imposed on both ends, a structure for mounting sensing devices for measuring a vehicle load which allows the sensing devices to obtain a detection value according to the actual load without being affected by the loading condition of baggage on the rear body, the inclination condition of the road, the steering condition of a handwheel, and the like.

It is a second object of the invention to provide a structure for mounting sensing devices for measuring a vehicle load which can simplify a process of attaching the sensing device to the axle member and reduce the production cost.

BRIEF DESCRIPTION OF THE DRAWINGS

FIGS. 3(a) and (3b) show shows a condition in which the sensing device is housed in a first case assy. shown in FIG. 1, FIG. 3(a) is a section view, and FIG. 3(b) is a side view;

FIGS. 4(a) and 4(b) show a condition in which the sensing device is housed in a second case assy. shown in FIG. 1, FIG. 4(a) is a section view, and FIG. 4(b) is a side view;

FIG. 5 is a section view of a conduit pipe which is coupled to one end of the second case assy. shown in FIG. 4;

FIG. 6(a) is a section view of a cap assy. shown in FIG. 1, and FIG. 6(b) is a side view thereof;

FIGS. 7(a) and 7(b) show a dispersed load from a vehicle on a shackle pin and the sensing devices therein shown in FIG. 1, FIG. 7(a) is a view illustrating an equally dispersed condition, and FIG. 7(b) is a view illustrating an unequally dispersed condition;

FIG. 9(a) is a section view of a portion of a shackle pin of the vehicle into which the sensing device is fitted, and FIG. 9(b) is a front view thereof;

FIG. 12(a) and 12(b) show a dispersed load from a vehicle on the shackle pin and the sensing devices in the inside thereof shown in FIG. 11, FIG. 12(a) is a view illustrating an equally dispersed condition, and FIG. 12(b) is a view illustrating an unequally dispersed condition.

DISCLOSURE OF THE INVENTION

Figure 1:
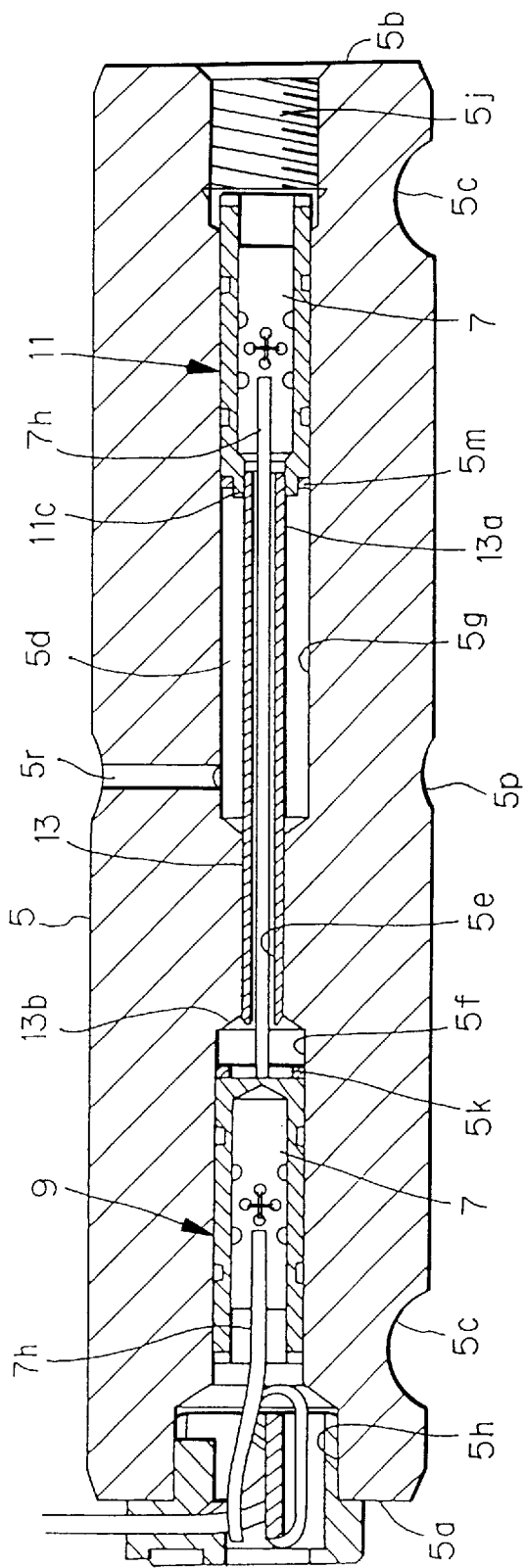
FIG. 1 is a section view of a structure for mounting sensing devices according to an embodiment of the invention.

The invention which attains the above-mentioned objects is a structure for mounting sensing devices for measuring a vehicle load on an axle member in which a vehicle load is dispersedly imposed on both ends, wherein recessed housing portions are formed along an axial direction of the axle member in both end portions of the axle member, respectively, and the sensing devices 7 are housed, mounted, and fixed in the recessed housing portions, directions of the sensing devices in a circumferential direction and a radial direction of the axle member being coincident with each other.

Moreover, in the invention, the structure comprises two case members in which the sensing devices are housed and fixed, respectively, the sensing devices are housed together with the case members in the recessed housing portions of the axle member, and the sensing devices are mounted and fixed to the recessed housing portions via the case members, respectively.

Furthermore, in the invention, a through hole through which the recessed housing portion on one end side of the axle member communicates with the recessed housing portion on the other end side is formed in the axle member, lead portions for outputting a signal of the sensing device which is mounted and fixed to the recessed housing portion on the other end side is led to the recessed housing portion on the one end side via the through hole, and the lead portions of the sensing devices in both end portions of the axle member are led to the outside of the one end of the axle member from the recessed housing portion on the one end side.

According to the invention, when a load from a vehicle is dispersedly imposed on an axle member of the vehicle, the two sensing devices which are housed in the recessed housing portions in both end portions of the axle member, directions of the sensing devices in the circumferential direction and a radial direction of the axle member being coincident with each other, are respectively distorted by the dispersed loads from the vehicle. Accordingly, sensing outputs are generated in the two sensing devices in accordance with the dispersed loads.

Therefore, irrespective of whether the load from the vehicle is equally dispersed in the axial direction of the axle member, or unequally dispersed or biased to either one of end portions of the axle member, a sensing output corresponding to the total load from the vehicle acting on the axle member is obtained by adding the sensing outputs of the two sensing devices. Based on the sensing output, it is possible to correctly calculate the load of the vehicle.

Furthermore, according to the invention, when the sensing devices are to be housed in the recessed housing portions in both end portions of the axle member, two case members in which the sensing devices are respectively housed and fixed are used. These case members are housed in and fixed to the respective recessed housing portions of the axle member. The inside of each case member is formed in accordance with the shape of the corresponding sensing device, and the outside of the case member is formed in accordance with the shape of each of the recessed housing portions. As a result, it is possible to eliminate complicatedness such as that, in order to prevent the sensing devices from being distorted in the recessed housing portions when no load is imposed on the axle member from the vehicle, the shapes of the sensing devices and the recessed housing portions should be elaborated or the assembling of the sensing devices to the axle member should be elaborated. Therefore, it is possible to reduce the production cost.

Moreover, the lead portions for outputting a signal of the sensing device which is attached and fixed to the recessed housing portion on the other end side of the axle member are led to the recessed housing portion on the one end side via the through hole through which the recessed housing portion on one end side of the axle member communicates with the recessed housing portion on the other end side. Then, the lead portions of the sensing devices on both end portions of the axle member are led to the outside of one end of the axle member from the recessed housing portion on the one end side. As compared with the case where the lead portions are respectively led to the outside from the end portions of the axle member, therefore, the wiring of these lead wires is facilitated. Furthermore, breakage of the lead wires, abnormal sensing outputs, and the like which may be caused by a contact of the lead wires with a peripheral part of the vehicle to which the axle member is attached can be prevented from occurring.

BEST MODE FOR CARRYING OUT THE INVENTION

Hereinafter, an embodiment of the invention will be described with reference to the accompanying drawings. Portions identical with or corresponding to those described in the prior art are designated by the same reference numerals.

Figure 9A:
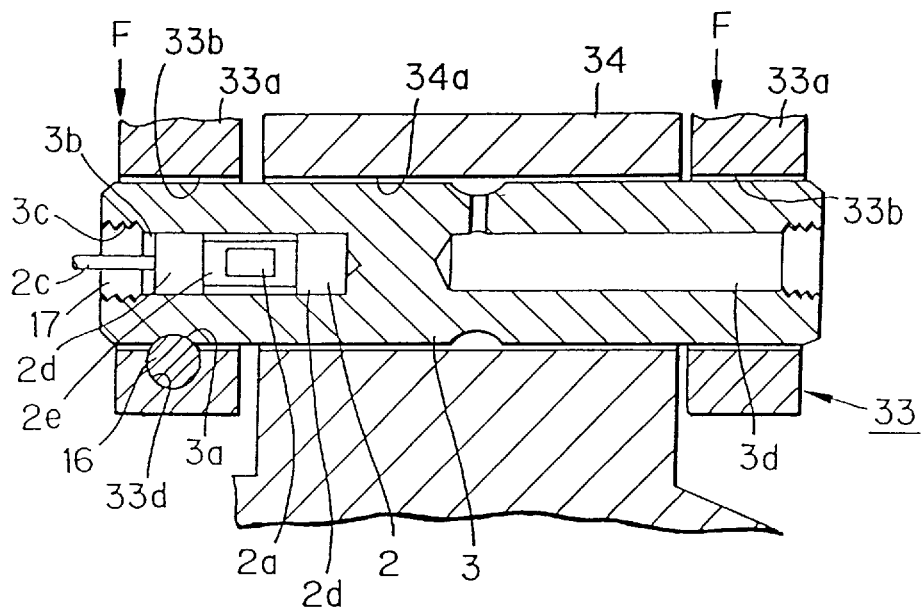
FIGS. 9(a) and 9(b) show a method of fixing a sensing device of a prior art example which has been proposed by the applicant.
Figure 9B:
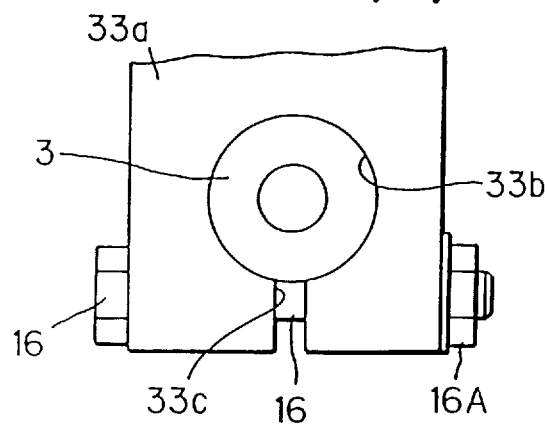
Figure 11:
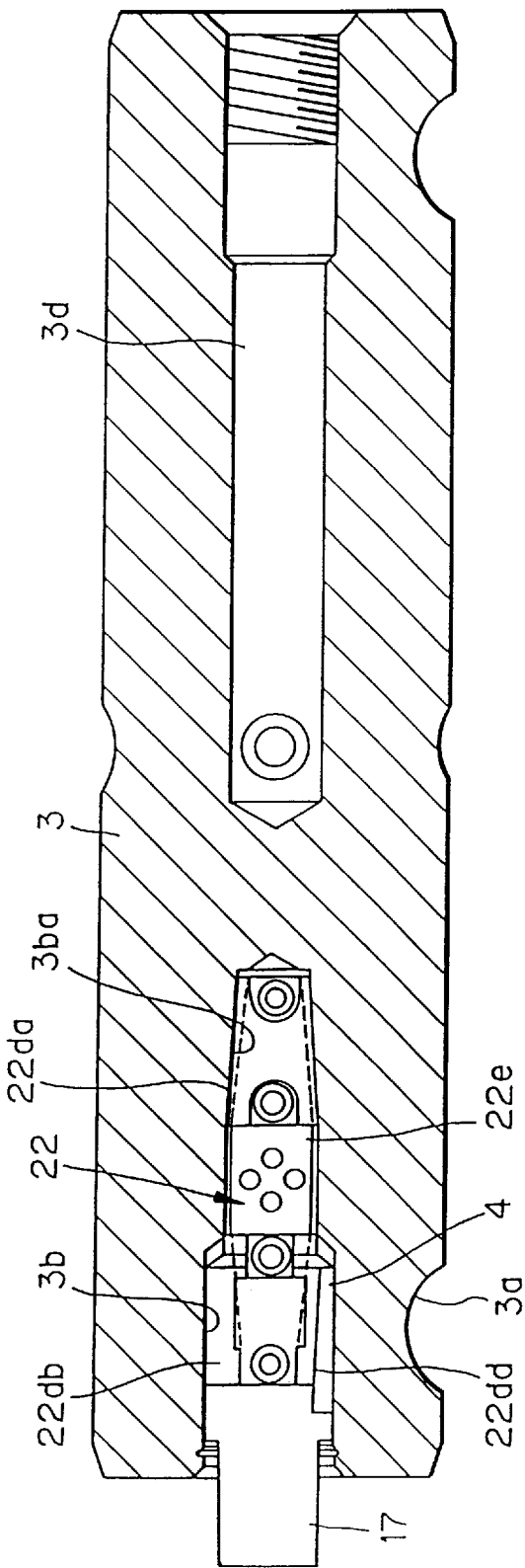
FIG. 11 is a section view of a shackle pin showing a structure for mounting the sensing device shown in FIG. 10 to the shackle pin of a prior art example which has been proposed by the applicant.

FIG. 1 is a section view of a structure for mounting sensing devices according to an embodiment of the invention in which the sensing devices are housed in a shackle pin used for coupling the bracket 33 to the shackle 34 shown in FIG. 9(a).

As shown in the figure, the shackle pin 5 (corresponding to the axle member) of the embodiment is formed as a column having an outer diameter which is slightly smaller than the inner diameters of the insertion holes 33b, 34a, and 33b of the side faces 33a of the bracket 33 and the shackle 34.

In an outer circumferential portion which is closer to one end 5a in the axial direction of the shackle pin 5, an annular groove 5c is formed. In a condition where the shackle pin 5 is inserted from the other end 5b into the insertion holes 33b, 34a, and 33b of the side faces 33a of the bracket 33 and the shackle 34 which are mutually positioned, the groove 5c can be engaged with a fixing bolt 16 inserted into the through hole 33d from the side face 33a of the bracket 33 in which the through hole 33d is formed. Another similar groove 5c is formed in an outer circumferential portion which is closer to the other end 5b of the shackle pin 5 and symmetrical to the groove 5c.

A grease groove 5p having an arcuate end face is formed in a middle outer circumferential portion in the axial direction of the shackle pin 5.

A through hole 5d which elongates from the one end 5a to the other end 5b is bored in the shackle pin 5.

The through hole 5d has a smaller diameter portion 5e (corresponding to the through hole) slightly closer to the one end 5a with respect to the center in the axial direction of the shackle pin 5; first and second middle diameter portions 5f and 5g (corresponding to the recessed housing portions) connected to both sides in the axial direction of the smaller diameter portion 5e, respectively; a first larger diameter portion 5h which elongates from the one end 5a to the first middle diameter portion 5f; and a second larger diameter portion 5j which elongates from the other end 5b to the second middle diameter portion 5g. A grease supplying hole 5r which elongates from a portion of the second middle diameter portion closer to the smaller diameter portion 5e to the grease groove 5p is opened along a radial direction of the shackle pin 5.

The first larger diameter portion 5h has a slightly larger diameter than that of the second larger diameter portion 5j. The first and second middle diameter portions 5f and 5g have the same diameter. Sensing devices 7 and 7 for measuring a load are housed in the first and second middle diameter portions 5f and 5g, respectively.

Figure 2:
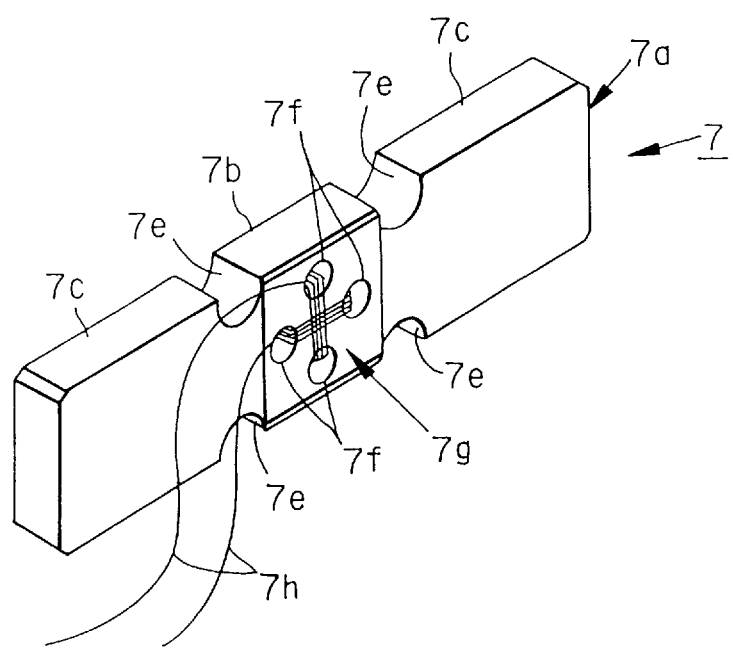
FIG. 2 is a perspective view of the sensing device shown in FIG. 1.
Figure 8:
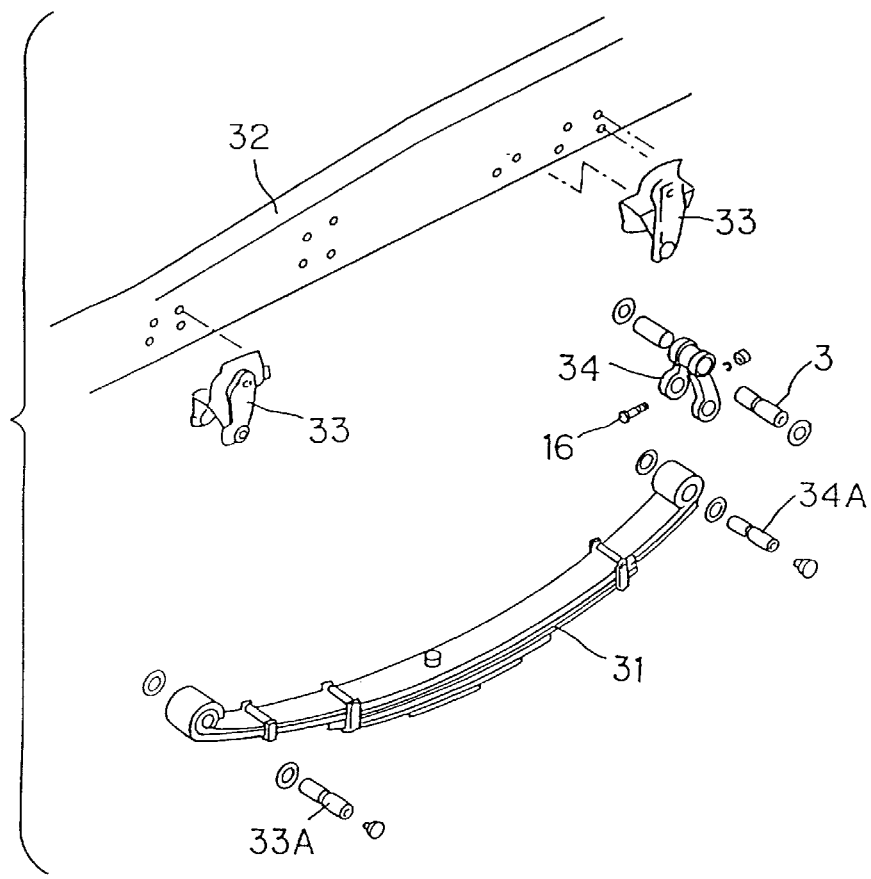
FIG. 8 is an exploded perspective view of a large vehicle such as a truck and showing positions of the vehicle where the load measuring is performed by the load measuring apparatus to which the invention is applied.
Figure 10:
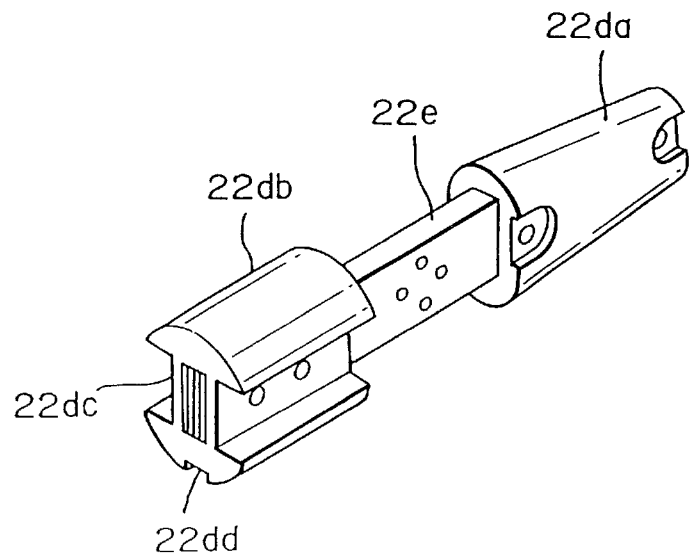
FIG. 10 is a perspective view of a sensing device of another prior art example which has been proposed by the applicant.

As shown in a perspective view of FIG. 2, each of the sensing devices 7 and 7 comprises a plate-like member 7a and a resistance wire 7g serving as a sensing portion.

The plate-like member 7a is made of a magnetic material such as Permalloy and has a flat and substantially rectangular shape as seen in a plan view, and comprises a coil portion 7b at a substantial center in the longitudinal direction, and fixing portions 7c and 7c on both sides thereof.

Substantially semicircular cutout portions 7e for reducing a stress on the plate-like member 7a are respectively formed in four edge portions which are in the edge in the width direction of the plate-like member 7a and perpendicular to the longitudinal direction and in boundaries between the coil portion 7b and the fixing portions 7c and 7c. Four through holes 7f are opened in the coil portion 7b surrounded by the four cutout portions 7e, with intervals in the longitudinal and width directions.

The resistance wire 7g is wound with passing through the two through holes 7f and 7f opposing each other in the longitudinal and width directions, and then wound with passing through the remaining two through holes 7f and 7f. Lead portions 7h at both ends of the wire are led out from the through holes 7f and 7f, and sheathed by an insulating material such as vinyl.

As shown in FIG. 1, one of the thus configured sensing devices 7 is housed in a first case assy. 9 (corresponding to the case member), and then housed together with the first case assy. 9 in the first middle diameter portion 5f of the shackle pin 5. The other sensing device 7 is housed in a second case assy. 11 (corresponding to the case member), and then housed together with the second case assy. 11 in the second middle diameter portion 5g of the shackle pin 5.

The first case assy. 9 has a cylindrical shape in which one end is closed, i.e., which has a bottom, as shown in a section view and a side view of FIGS. 3(a) and 3(b) showing a condition where the sensing device 7 is housed.

As shown in FIG. 1, the outer diameter of the first case assy. 9 is formed so as to have a size substantially coincident with the inner diameter of the first middle diameter portion 5f, and the inner diameter is formed so as to have a size substantially coincident with the size of the plate-like member 7a in the width direction.

As shown in FIG. 3(a), recessed portions 9a which are used for welding edge portions of the fixing portions 7c and 7c of the plate-like member 7a to the inner circumferential face by laser spot welding are respectively formed in four outer circumferential face portions of the first case assy. 9 which face the edges in the width direction of both the fixing portions 7c and 7c in the condition where the sensing device 7 is housed inside the first case assy. 9 and pressed into the bottom.

As shown in FIG. 3(b), a pair of wire passing recessed grooves 9b are formed between the ends of the first case assy. 9 in outer circumferential face portions which are displaced from the recessed portions 9a by 90° in phase in the circumferential direction of the first case assy. 9.

The above-mentioned first case assy. 9 is, as shown in FIG. 1, constructed in such a manner that it is inserted from the bottomed end portion into the first middle diameter portion 5f of the shackle pin 5 until the bottomed end portion is engaged with an annular stopper groove 5k which is inwardly protruded from the inner circumferential wall of the first middle diameter portion 5f, whereby the first case assy. is housed in the first middle diameter portion 5f so that it cannot rotate in the circumferential direction.

The second case assy. 11 has a cylindrical shape as shown in a section view and side views of FIGS. 4(a) and 4(b) showing a condition where the sensing device 7 is housed.

The outer diameter of the second case assy. 11 is formed so as to have a size substantially coincident with the inner diameter of the second middle diameter portion 5g of the shackle pin 5, and the inner diameter is formed so as to have a size substantially coincident with the size of the plate-like member 7a in the width direction thereof. The inner diameter of one end 11c of the second case assy. 11 is formed so as to be smaller than the size of the plate-like member 7a in the width direction thereof.

As shown in FIG. 4(a), recessed portions 11a which are used for welding edge portions of the fixing portions 7c and 7c of the plate-like member 7a to the inner circumferential face by laser spot welding are respectively formed in outer circumferential face portions of the second case assy. 11 which face the edges in the width direction of both the fixing portions 7c and 7c in the condition where the sensing device 7 is housed inside the second case assy. 11 from the other end 11d and pressed to one end 11c.

As shown in FIG. 4(b), a pair of recessed grooves 11b are formed between the ends 11c and lid of the second case assy. 11 in outer circumferential face portions which are displaced from the recessed portions 11a by 90° in phase in the circumferential direction of the second case assy. 11.

FIG. 5 is a section view of a conduit pipe 13 which is coupled to the one end 11c formed in a small diameter portion of the second case assy. 11.

The conduit pipe 13 has a tube-like shape. The inner diameter of the pipe is formed so as to have a size which allows the two lead portions 7h sheathed by the insulating material to pass through the pipe, and the outer diameter is formed so as to have a size substantially coincident with the outer diameter of the smaller diameter portion 5e of the shackle pin 5.

As shown in FIG. 4(a), an outer circumferential face portion on the side of a basal end 13a of the conduit pipe 13 is formed to have a diameter which is slightly smaller than that of the other outer circumferential face portion so that the diameter is substantially coincident with the inner diameter of the one end 11c of the second case assy. 11. An outer circumferential face portion on the side of an end 13b of the conduit pipe 13 is formed so as to have a tapered shape.

Regarding the above-mentioned second case assy. 11 and the conduit pipe 13, as shown in FIG. 1, the second case assy. 11 is inserted into the second middle diameter portion 5g while the conduit pipe 13 is inserted from the second middle diameter portion 5g into the smaller diameter portion 5e in a condition where the basal end 13a of the conduit pipe 13 is coupled to the one end 11c of the second case assy. 11.

The insertion is performed until the one end 11c of the second case assy. 11 is engaged with a stopper groove 5m which is inwardly protruded from an inner circumferential wall portion at a substantial center of the second middle diameter portion 5g in the axial direction of the shackle pin 5.

Regarding the second case assy. 11 and the conduit pipe 13, in the condition where the one end 11c of the second case assy. 11 is engaged with the stopper groove 5m, the whole of the second case assy. 11 is housed in the second middle diameter portion 5g in such a manner that it cannot rotate in the circumferential direction, and the whole of the conduit pipe 13 is constructed in such a manner that the end 13b of the conduit pipe 13 reaches the boundary position between the smaller diameter portion 5e and the second middle diameter portion 5f.

The first larger diameter portion 5h is closed by a cap assy. 15 shown in a section view and a side view of FIGS. 6(a) and 6(b), in the condition where the two sensing devices 7 are inserted into the through hole 5d of the shackle pin 5 via the first and second case assemblies 9 and 11 as described above.

As shown in FIG. 6(a), the cap assy. 15 comprises, a rubber bush 15a, a relay substrate 15e, and a wiring flat cable 15f.

The rubber bush 15a is made of a soft rubber with elasticity, or the like, and has a hollow and substantially cylindrical shape configured by smaller and larger diameter portions 15b and 15c having different outer diameters, and a through hole 15d passing through the smaller and larger diameter portions 15b and 15c.

As shown in FIG. 1, the outer diameter of the smaller diameter portion 15b is formed so as to have a size substantially coincident with the inner diameter of the first larger diameter portion 5h of the shackle pin 5. The outer diameter of the larger diameter portion 15c is formed so as to be larger than the inner diameter of the first larger diameter portion 5h and smaller than the outer diameter of the shackle pin 5. The rubber bush is configured in such a manner that, in a condition where the smaller diameter portion 15b is fitted into the first larger diameter portion 5h, the end face of the larger diameter portion 15c on the side of the smaller diameter portion 15b is closely in contact with one end of the shackle pin 5.

As shown in FIG. 6(a), the relay substrate 15e is housed and held in the through hole 15d of the rubber bush 15a, and a conductive pattern (not shown) is formed on at least one face of the substrate.

The wiring flat cable 15f is formed so as to be flat by bonding four lead wires which are sheathed by an insulating material such as vinyl to each other by an adhesive. In each lead wire, the sheath of one end side is peeled off, and the core wire is connected to the conductive pattern of the relay substrate 15e by soldering or the like.

The other end of the wiring flat cable 15f is led out in the radial direction of the rubber bush 15a via a through hole 15g which is bored from the through hole 15d of the rubber bush 15a to the outer circumferential face of the larger diameter portion 15c. In FIGS. 6(a) and 6(b), 15h designates a support portion for preventing a portion of the wiring flat cable 15f which is led to the outside of the rubber bush 15a and closer to the larger diameter portion 15c, from being broken.

Next, the assembling of the sensing devices 7 to the shackle pin 5 will be described.

First, the basal end 13a of the conduit pipe 13 is coupled to the one end 11c of the second case assy. 11, and the sensing device 7 is housed inside the second case assy. 11. The two lead portions 7h are led to the outside from the end 13b of the conduit pipe 13.

Next, in this condition, the sensing device 7 is positioned in the circumferential direction of the second case assy. 11 with respect to the second case assy. 11 in such a manner that, in the fixing portions 7c and 7c of the sensing device 7, the edge portions of the plate-like member 7a in the width direction face the recessed portions 11a, respectively. The housed sensing device 7 is fixed to the inside of the second case assy. 11 by laser spot welding of the recessed portions 11a and filling of the inside of the second case assy. 11 with a mold agent.

After the fixing is completed, the second case assy. 11 is inserted into the second middle diameter portion 5g until the one end 11c is engaged with the stopper groove 5m, while the conduit pipe 13 is inserted into the smaller diameter portion 5e via the second larger diameter portion 5j and the second middle diameter portion 5g of the shackle pin 5. The lead portions 7h of the sensing device 7 are led to the side of the first middle diameter portion 5f from the end 13b of the conduit pipe 13 which reaches the boundary position between the smaller diameter portion 5e and the second middle diameter portion 5f, and their ends are led to the outside of the first larger diameter portion 5h.

Thereafter, in the same manner as the fixing of the sensing device 7 to the second case assy. 11, the sensing device 7 is positioned in the circumferential direction of the first case assy. 9 with respect to the first case assy. 9 in such a manner that, in the fixing portions 7c and 7c of the sensing device 7, the edge portions of the plate-like member 7a in the width direction face the recessed portions 9a, respectively. The housed sensing device 7 is fixed to the inside of the first case assy. 9 by laser spot welding of the recessed portions 9a and filling of the inside of the first case assy. 9 with a mold agent.

After the fixing is completed, the direction of the plate-like member 7a in the circumferential direction of the shackle pin 5 is made coincident with the sensing device 7 of the second case assy. 11. In addition, in the condition where the lead portions 7h of the sensing device 7 in the second case assy. 11 of which the ends are led to the outside of the first larger diameter portion 5h are housed in the wire passing recessed groove 9b of the first case assy. 9, the first case assy. 9 is inserted into the first middle diameter portion 5f until the bottomed end portion is engaged with the stopper groove 5k.

As a result, the lead portions 7h of the sensing device 7 in the second case assy. 11 are led out to the side of the first larger diameter portion 5h via the gap between the first middle diameter portion 5f and the wire passing recessed groove 9b of the first case assy. 9.

Next, the lead portions 7h of the sensing device 7 in the first case assy. 9 are led out from the open end portion of the first case assy. 9 to the side of the first larger diameter portion 5h. Then, they are led to the outside of the first larger diameter portion 5h together with the lead portions 7h of the sensing device 7 in the second case assy. 11.

Thereafter, sheathes of the lead portions 7h of the sensing devices 7 are peeled off, and the core wires (not shown) are exposed. The core wires are connected to the conductive pattern on the relay substrate 5e by soldering or the like so that the core wires are electrically connected to the four lead wires of the wiring flat cable 15f of the cap assy. 15 in a one-to-one relationship.

In the last step, the smaller diameter portion 15b of the rubber bush 15a of the cap assy. 15 is fitted into the first larger diameter portion 5h, so as to close the one end 5a of the shackle pin 5. Also, grease for reducing friction between the inner wall of the insertion hole 34a of the shackle 34 and the outer circumference of the shackle pin 5 is injected and filled from a space between the recessed groove 11b of the second case assy. 11 and the second middle diameter portion 5g, into a portion of the second middle diameter portion 5g closer to the smaller diameter portion 15b than the stopper groove 5m. Thereafter, a tap which is not shown is fitted into the second larger diameter portion 5j, thereby closing the other end 5b of the shackle pin 5.

In the above-mentioned manner, the assembling of the sensing devices 7 to the shackle pin 5 is completed.

Next, the attachment of the shackle 34 to the bracket 33 wherein the shackle pin 5 in which the sensing devices 7 have been assembled inside the ends 5a and 5b is used will be described.

First, the shackle pin 5 is inserted from the second larger diameter portion 5j into the insertion holes 33b, 34a, and 33b of the side faces 33a of the bracket 33 and the shackle 34 which are mutually positioned. In this condition, the fixing bolt 16 is inserted into the through hole 33d of one of the side faces 33a of the bracket 33, so as to be engaged with the groove 5c of the shackle pin 5.

Next, the gap of the slit 33c is reduced by the screw motion of the nut 17 which is screwed onto the end of the fixing bolt 16. This causes the inner diameter of the insertion hole 33b of the one side face 33a to be reduced, thereby clamping and fixing the shackle pin 5.

In the above-described manner, the attachment is completed. In this condition, a slight clearance is formed between the outer circumference of the shackle pin 5 and the inner circumferences of the insertion holes 33b, 34a, and 33b of the bracket 33 and the shackle 34.

The first case assy. 9 in the shackle pin 5 which is positioned in the axial direction by the engagement of the fixing bolt 16 with the groove 5c of the shackle pin 5 is located so as to stretch over the insertion hole 33b of the side face 33a of the bracket 33 on which the slit 33c is formed and the insertion hole 34a of the shackle 34. Similarly, the second case assy. 11 is located so as to stretch over the insertion hole 33b of the other side face 33a of the bracket 33 and the insertion hole 34a of the shackle 34.

Next, the function (operation) will be described.

When a load G is imposed from the vehicle on the shackle pin 5 via the rear body frame 32 and the side faces 33a of the bracket 33, a sharing force acts on the shackle pin 5. The sensing devices 7 and 7 which are disposed in the shackle pin are distorted, and the sensing outputs are varied. The load of the vehicle is detected from the sum of these sensing outputs.

The operation is specifically described in detail. In a condition where the load is equally dispersed in the right and left directions of the vehicle, for example, the center S of the load G acting on the shackle pin 5 is positioned in a substantial center portion in the axial direction of the shackle pin 5 as schematically shown in FIG. 7(a). Halves of the load G are equally imposed from the side faces 33a of the bracket 33 on the ends 5a and 5b of the shackle pin 5 in the axial direction, respectively. In accordance with the load of G/2, each of the sensing devices 7 and 7 is distorted.

Accordingly, a sensing output corresponding to (G/2)+(G/2)=Load G is obtained by adding the sensing outputs of the sensing devices 7 and 7. Based on this, the load of the vehicle is correctly 5 calculated.

If the load dispersion of the vehicle is displaced in either of the right and left directions, the center S of the load G is displaced toward the one end 5a of the shackle pin 5 in the axial direction as schematically shown in FIG. 7(b). For example, ¾ of the load G is imposed from the one side face 33a of the bracket 33 on the side of the one end 5a of the shackle pin 5, and ¼ of the load G is imposed from the other side face 33a of the bracket 33 on the side of the other end 5b of the shackle pin 5. In such a case, the sensing device 7 in the first case assy. 9 is distorted in accordance with the load of 3G/4, and the sensing device 7 in the second case assy. 11 is distorted in accordance with the load of G/4.

Accordingly, also in this case, a sensing output corresponding to (3G/4)+(G/4)=Load G is obtained by adding the sensing outputs of the sensing devices 7 and 7. Based on this, the load of the vehicle is correctly calculated.

As described above, according to the structure for mounting sensing devices for measuring a load according to the embodiment, the through hole 5d is formed between the end portions 5a and 5b of the shackle pin 5 which is used for coupling the shackle 34 with the side faces 33a of the yoke bracket 33 fixed to the rear body frame 32 of the vehicle. In the through hole 5d, the sensing devices 7 are respectively housed and fixed in the first and second larger diameter portions 5h and 5j which constitute portions closer to the end portions 5a and 5b of the shackle pin 5. In the condition where the side faces 33a of the bracket 33 are coupled to the shackle 34 by the shackle pin 5, the sensing device 7 on the side of the one end 5a of the shackle pin 5 is located so as to stretch over the insertion hole 33b of the side face 33a of the bracket 33 on which the slit 33c is formed, and the insertion hole 34a of the shackle 34. Similarly, the sensing device 7 on the side of the other end 5b of the shackle pin 5 is located so as to stretch over the insertion hole 33b of the other side face 33a of the bracket 33 and the insertion hole 34a of the shackle 34.

With such a construction, the sensing devices 7 and 7 are respectively distorted in accordance with partial loads of the load G acting on the shackle pin 5 from the vehicle, the partial loads respectively acting on the end portions 5a and 5b of the shackle pin 5. The sensing outputs in accordance with the distortion are generated in the sensing devices 7 and 7.

Accordingly, irrespective of whether the load is equally dispersed in the right and left directions of the vehicle, or the load dispersion of the vehicle is displaced in either of the right and left directions, a sensing output corresponding to the load G from the vehicle and acting on the shackle pin 5 is obtained by addition of the sensing outputs of the respective sensing devices 7 and 7. Based on this, the load of the vehicle can be correctly calculated.

According to the embodiment, when the sensing devices 7 are to be respectively disposed in the ends 5a and 5b of the shackle pin 5, the lead portions 7h of the sensing device 7 on the side of the other end 5b of the shackle pin 5 are led to the one end 5a of the shackle pin 5 via the through hole 5d formed between the ends 5a and 5b of the shackle pin 5. The lead portions 7h are led to the outside from the shackle pin 5 together with the lead portions 7h of the sensing device 7 on the side of the one end 5a.

With this construction, as compared with the case where the lead portions 7h of the sensing devices 7 are respectively led out from the ends 5a and 5b of the shackle pin 5, the wiring of the lead portions 7h in the process of coupling the shackle 34 with the bracket 33 by the shackle pin 5 is facilitated. In addition, breakage (short-circuit or the like) of the lead portions 7h and the sensing devices 7 and 7, abnormal sensing outputs, and the like which may be caused by a contact of the lead portions with the bracket 33, the shackle 34, or their peripheral members can be prevented from occurring.

Unlike the embodiment, the attachment of the sensing devices 7 and 7 to the first and second larger diameter portions 5h and 5j of the shackle pin 5 may be performed without using the first and second case assemblies 9 and 11. The sensing devices 7 and 7 may be directly fixed to the first and second larger diameter portions 5h and 5j.

In the embodiment, however, the sensing devices 7 are housed and fixed in the first and second case assemblies 9 and 11, and thereafter the first and second case assemblies 9 and 11 are respectively inserted into the first and second larger diameter portions 5h and 5j of the shackle pin 5. The sensing devices 7 and 7 are fixed to the first and second larger diameter portions 5h and 5j of the shackle pin 5 via the first and second case assemblies 9 and 11, respectively. This construction has the following advantages and hence advantageous.

That is, unlike the conventional art, it is not required to precisely machine one of the fixing members for the sensing device, and the corresponding inner circumferential wall portion of the first and second larger diameter portions 5h and 5j so as to be a truncated cone having a tapered face.

In addition, it is unnecessary to perform the following. A key groove is formed on the outer circumferences of the fixing members and the first and second case assemblies 9 and 11. After the insertion into the first and second larger diameter portions 5h and 5j, a wedge type key is pressingly inserted into the key groove while appropriately controlling the applying condition of a force. A force of some extent is applied so that the bottomed end portion and the end 11c of the first and second case assemblies 9 and 11 are pressed against the stopper grooves 5k and 5m.

Accordingly, the assembling process of the sensing devices 7 to the shackle pin 5 can be simplified, and the production cost can be reduced.

In the embodiment, the structure for mounting the sensing devices 7 and 7 to the ends 5a and 5b of the shackle pin 5 which is used for coupling the shackle 34 to the bracket 33 has been exemplarily described. It should be appreciated that the invention can be widely applied when a sensing device for measuring a load is attached to any axle member in a vehicle in which a load of the vehicle is dispersedly imposed on both ends of the axle member.

INDUSTRIAL APPLICABILITY

As described above, according to the invention, in a structure for mounting sensing devices for measuring a load on an axle member in which a vehicle load is dispersedly imposed on both ends, wherein recessed housing portions are formed along the axial direction of the axle member in both end portions of the axle member, respectively, and the sensing devices 7 are housed, mounted, and fixed in the recessed housing portions, directions of the sensing devices in a circumferential direction and a radial direction of the axle member being coincident with each other.

Accordingly, when a load of a vehicle is dispersedly imposed on an axle member of the vehicle, the two sensing devices which are housed in the recessed housing portions in both end portions of the axle member, directions of the sensing devices in the circumferential direction and a radial direction of the axle member being coincident with each other, are respectively distorted by the dispersed loads from the vehicle. Accordingly, sensing outputs are generated in the two sensing devices in accordance with the dispersed loads.

Therefore, irrespective of whether the load from the vehicle is equally dispersed in the axial direction of the axle member, or unequally dispersed or biased to either one of end portions of the axle member, a sensing output corresponding to the total load from the vehicle acting on the axle member is obtained by adding the sensing outputs of the two sensing devices. Based on the sensing output, it is possible to correctly calculate the load of the vehicle.

According to the invention, the structure comprises two case members in which the sensing devices are housed and fixed, respectively, the sensing devices are housed together with the case members in the recessed housing portions of the axle member, and the sensing devices are mounted and fixed to the recessed housing portions via the case members, respectively. Therefore, it is possible to eliminate complicatedness such as that, in order to prevent the sensing devices from being distorted in the recessed housing portions when no load is imposed on the axle member from the vehicle, the shapes of the sensing devices and the recessed housing portions should be elaborated or the assembling of the sensing devices to the axle member should be elaborated. Consequently, it is possible to reduce the production cost.

Furthermore, according to the invention, a through hole through which the recessed housing portion on one end side of the axle member communicates with the recessed housing portion on the other end side is formed in the axle member, lead portions for outputting a signal of the sensing device which is mounted and fixed to the recessed housing portion on the other end side is led to the recessed housing portion on the one end side via the through hole, and the lead portions of the sensing devices in both end portions of the axle member are led to the outside of the one end of the axle member from the recessed housing portion on the one end side. As compared with the case where the lead portions are respectively led to the outside from the end portions of the axle member, therefore, the wiring of these lead wires is facilitated. Furthermore, breakage of the lead wires, abnormal sensing outputs, and the like which may be caused by a contact of the lead wires with a peripheral part of the vehicle to which the axle member is attached can be prevented from occurring.

I claim:

1. A structure for measuring a vehicle load, comprising:

an axle member having (1) two end portions in which two recessed housing portions are respectively formed along an axial direction of said axle member, and (2) a through hole extending between said two recessed housing portions;

two case members respectively housed in said two recessed housing portions of said axle member;

two sensing devices respectively mounted in said two case members, and having respective lead portions for outputting a signal of said two sensing devices, said lead portions of one of said two sensing devices extending through said through hole, such that said lead portions of said two sensing devices extend from one of two said recessed housing portions.

2. The structure according to claim 1, further comprising:

a conduit pipe extending through said through hole and receiving said lead portions of said one of said two sensing devices.

* * * * *